United States Patent [19]
Schneider et al.

[11] Patent Number: 5,491,370
[45] Date of Patent: Feb. 13, 1996

[54] INTEGRATED AC MACHINE

[75] Inventors: Eric D. Schneider, Carmel; Steven R. McMullen, Anderson; Kaushik Rajashekara, Carmel; Wayne J. Loynes, Indianapolis; William E. Boys, Anderson; Ronald A. Martin, Pendleton, all of Ind.

[73] Assignee: General Motors Corporation, Detroit, Mich.

[21] Appl. No.: 187,985

[22] Filed: Jan. 28, 1994

[51] Int. Cl.$^6$ .............................. H02K 9/19; H02K 5/20; H02K 11/00
[52] U.S. Cl. ........................... 310/54; 310/68 R; 310/89
[58] Field of Search ........................... 310/54, 58, 68 R, 310/89, 64; 363/141

[56] References Cited

U.S. PATENT DOCUMENTS

| | | | |
|---|---|---|---|
| 2,023,245 | 12/1935 | Schou | 172/281 |
| 3,733,503 | 5/1973 | Potter | 310/68 |
| 4,237,394 | 12/1980 | Aoki | 310/113 |
| 4,583,169 | 8/1985 | Smith et al. | 357/80 |
| 4,604,538 | 8/1986 | Merrill et al. | 310/68 |
| 4,908,757 | 3/1990 | Jensen et al. | 363/141 |
| 4,961,016 | 10/1990 | Peng et al. | 310/62 |
| 4,963,778 | 10/1990 | Jensen et al. | 310/68 |
| 5,142,432 | 8/1992 | Schneider | 361/91 |
| 5,159,218 | 10/1992 | Murry et al. | 310/68 R |
| 5,331,239 | 7/1994 | Kwun et al. | 310/68 R |
| 5,341,074 | 8/1994 | Zorzolo | 310/68 R |

FOREIGN PATENT DOCUMENTS

0531200A2  1/1992  European Pat. Off. .

Primary Examiner—Clayton E. LaBalle
Attorney, Agent, or Firm—Anthony Luke Simon

[57] ABSTRACT

An electric motive power unit including a multiple phase AC electric machine and heat dissipative electronic components therefor, the improvement wherein the machine is disposed in a thermally conductive housing having cooling fluid passages formed therein, and the heat dissipative electronic components are individually mounted on an exterior periphery of said housing and distributed in a fashion wherein circulation of the fluid through said fluid passages for the cooling of said machine also serves to cool said heat dissipative electronic components.

6 Claims, 7 Drawing Sheets

INTEGRATED AC MACHINE

This invention relates to an AC machine having integrated heat dissipative electronic components and, more particularly, to a unitary structure having a cooling apparatus common to both the machine and electronic components.

BACKGROUND OF THE INVENTION

Speed and torque control of an AC machine typically requires substantial electronic control hardware comprising a rectifier, filter element and an inverter. These elements, which may be water or air cooled, are customarily located remote from the machine and coupled to the machine by a lengthy cable. In an application such as an electric vehicle, this creates packaging difficulties and, without proper shielding, tends to produce significant levels of electromagnetic interference. The end result is a system of less than optimal design, and it may fall short of specified requirements of mass, volume, efficiency, EMI and cost.

To improve these shortcomings, it has been proposed to mount the electronic control hardware in proximity to the machine. See, for example, U.S. Pat. No. to Jensen et al., 4,908,757 issued Mar. 13, 1990. However, the improvements achieved by such arrangements have been limited due to the diverse cooling systems for the machine and the electronic hardware.

SUMMARY OF THE PRESENT INVENTION

The present invention is directed to an improved arrangement of an AC machine in heat dissipative electronic components thereof, wherein a single cooling system provides heat dissipation for both the electronic components and the AC machine.

According to the invention, the AC machine has a cast housing and the heat dissipative electronic components are mounted directly to the outer periphery of the machine housing. Cooling fluid is continuously circulated in a spiral fluid passage formed in the housing providing adequate cooling for both machine windings and the electronic components. Preferably, the motor housing is multi-faceted in profile providing a number of flat, longitudinally extending areas on the periphery of the housing for the direct mounting of heat dissipative electronic components. If the machine is of the multi-phase variety, electronic components of the inverter may be advantageously constructed in modular fashion for optimum space distribution and cooling.

In one embodiment, the machine is a five-phase induction machine and individual inverter half-legs are mounted on different peripheral faces in a generally octagonal housing. Polygonal bus bars interconnecting the modules wrap around the unit to provide the power gated to the machine by the inverter half-legs.

In electric vehicle applications, the arrangement of this invention is especially advantageous in terms of packaging and efficiency. The minimized inter-component lead lengths and superior cooling cooperate to achieve an overall packaging and energy efficiency not heretofore realized. Connections to the unit are simplified since only two power cables are required wherein the unit as a whole is a DC powered unit. Commercially available gating devices typically comprise silicon and therefore must be limited in operation to a predetermined temperature range. Failure to control the temperature of the gating devices is one common form of AC machine failure mode eliminated by this invention by mounting the gating device directly to the cooled housing of the AC machine. This, advantageously, eliminates the separate cooling system for the gating device.

A more detailed description of this invention, along with various embodiments thereof, is set forth below.

DETAILED DESCRIPTION OF THE INVENTION

Figure 1:
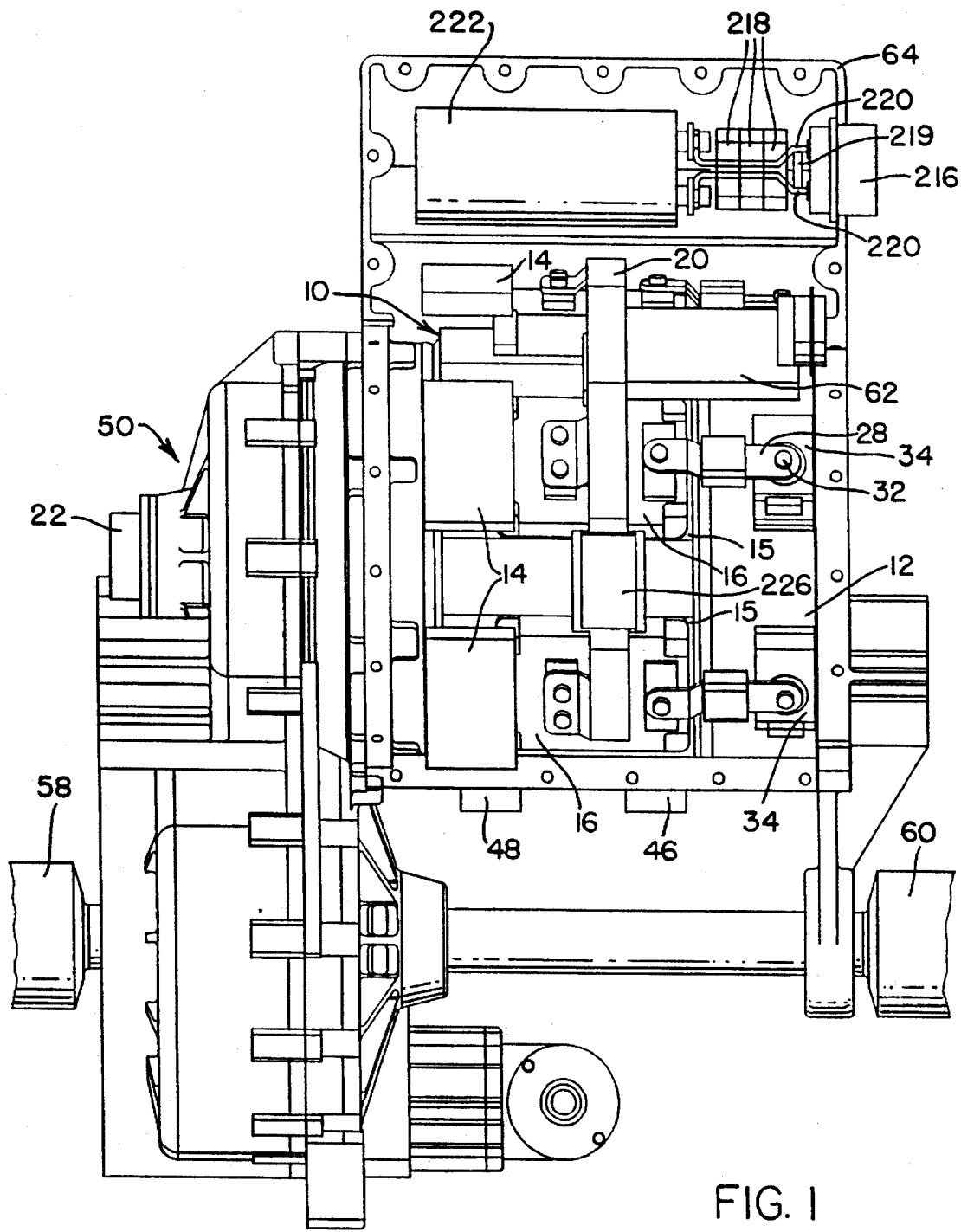
FIG. 1 is an elevational view of the AC machine of this invention in combination with an automotive transmission for an electric vehicle application.
Figure 2:
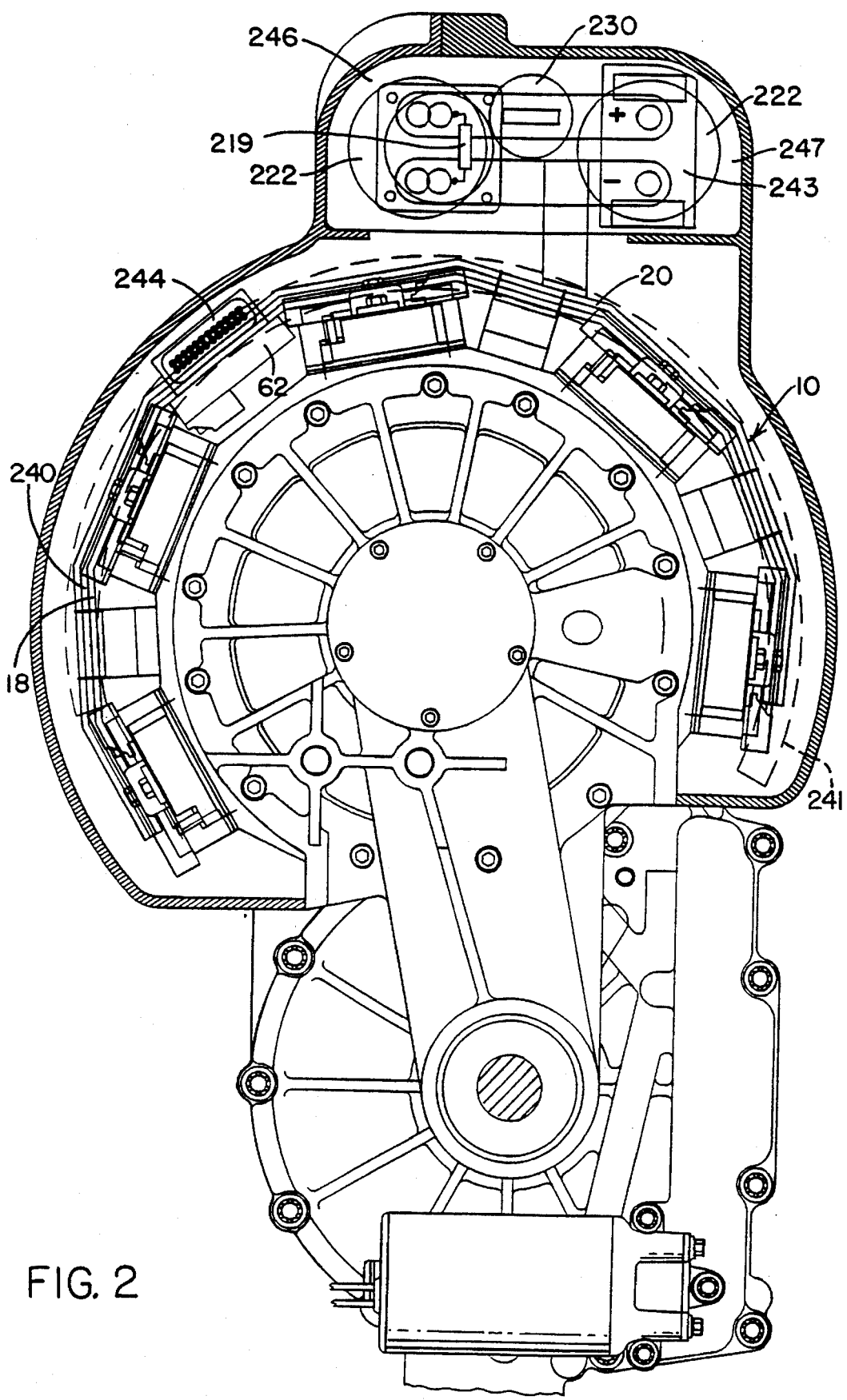
FIG. 2 is an end view of the unit depicted in FIG. 1 depicting five modular electronic components and a control electronics module mounted on different faces of the machine housing.

Referring to FIGS. 1 and 2, the electric drive unit shown according to this invention comprises AC motor 10 having a cast housing 12 with integral cooling passages. On several faces 15 of the cast housing 12 are mounted inverter half-legs, each comprising a gate driver 14, an insulated gate bipolar transistor (IGBT) module 16 and bus strap 28. The motor 10 shown is a five-phase induction motor having five coils. The motor 10 is shown attached to automotive transmission 50 of a known type having helical reduction gears driving an internal differential which drives output shafts 58 and 60.

The cast housing 12 is multi-faceted, defining a multiplicity of generally flat longitudinal extending surfaces or faces 15 about its outer periphery. The electronic components 14, 16, distributed as inverter half units, form modules, each module being constructed on a different one of the flat extending housing surface 15.

The housing manufacture is accomplished by the lost foam technique to "cast in place" the water passages. This process allows very accurate and repeatable casting. Lost foam casting is a technique well known to those skilled in the art.

To have an efficient thermal transfer from the power devices to the coolant contained in the motor housing, the housing surfaces 15 are flat and smooth and preferably micro-finished. Using the lost foam casting technique minimizes the amount of machining necessary for finishing flat surfaces 15.

In a known construction of AC motors, the stator of the motor has a fixed outer diameter and is press fit into the housing 12. This press fit provides alignment for the motor rotor shaft center to give an accurate air gap between the stator and the rotor. The cast housing 12 also protects the delicate stator windings.

The housing, with its integral water passages, efficiently cools the motor 10, power devices (IGBTs 16), and associated circuitry (gate drivers 14). The power devices of the inverter, IGBTs 16, are mounted (i.e., with screws) on the same shell under which the water is circulating for cooling the motor. Thus there is a common cooling system using the same plumbing paths for the motor 10 and the inverter components 14, 16. The thermal transfer between the stator and the housing 12 provides a large thermal mass to stabilize temperature extremes that may be encountered. This also stabilizes the water cooling loop to prevent rapid temperature cycling of the power devices. The common plumbing also reduces the potential for leaks and thus increases the reliability of the system.

The IGBTs 16 are solid state devices typically comprising silicon and, therefore, must be operated at a maximum junction temperature below 150 degrees Celsius. In practice, for reliability considerations, this junction temperature is limited to less than 125 degrees Celsius. The motor 10 can operate at temperatures as high as 150 degrees Celsius. The common cooling system comprising the spiral passages 74 (FIGS. 3 and 4) in the cast housing maintains both the IGBTs 16 and the motor 10 within their proper operating temperature ranges.

Fluid flow is provided to the inlet mouth 48 through the spiral passages 74 and out of outlet 46 to a radiator for fluid cooling and heat transfer into an atmosphere away from the motor unit. Fluid flow may be achieved in a known manner using an electric pump or a pump mechanically coupled to the motor output shaft.

The packaging of the integrated motor unit according to this invention has advantages readily apparent from the illustrations. A 100 horsepower motor with the inverter modules fits into a package of less than 18 inches across. This design reduces the amount of space necessary for the motor unit and electronics, eliminates the added cooling system for separate electronics and allows for more space for added features in the vehicle.

Further, a common shroud 64 may be placed over the integrated motor unit, covering the motor 10 and the electronics 14, 16 to, with the single shroud, both (a) shield EMI caused by both the motor 10 and the inverter components 14, 16, and (b) prevent human contact with high voltage components of both the motor 10 and the inverter components 14, 16. Integrating the inverter with the motor unit also reduces the length of conductors carrying AC signals, reducing the potential EMI broadcasting length of conductors and reducing the voltage drop in the AC conductors. The reduction in broadcast EMI length reduces the size and/or number of EMI shunting capacitors necessary. The reduced voltage drop in the AC conductors results in an overall increase in vehicle efficiency.

Copper bus bars 18 and 20, having a generally polygonal shape, extend circumferentially around the electronic component modules, specifically, IGBTs 16, and are mounted to the outer surfaces of the IGBTs 16 to provide the high voltage, high current DC power to each IGBT 16. The bus bars 18 and 20 comprise a stacked bus bar set. Bus bars 18 and 20 carry the high current, high voltage power and are stacked together sandwiching insulating layer 240. It has been found that by stacking the bus bar 18 and 20 as shown, the bus bars, together with their large surface areas, act as a large capacitor which helps (a) stabilize the voltage along the bus bars 18 and 20; (b) reduce EMI and (c) further reduce the necessary size and quantity of EMI reducing capacitors 226 that couple the bus bars 18 and 20.

The AC output current from each IGBT 16 is provided to the corresponding motor stator coil via a bus strap 28. Bus straps 28 couple the current to posts 66 (FIG. 3), which carry the current through current sensors 34 and through openings in the cast housing 12 to terminals coupled to the stator windings. Current sensors 34 are Hall effect type sensors that measure the current travelling through the copper posts 66 going to the stator windings.

Figure 3:
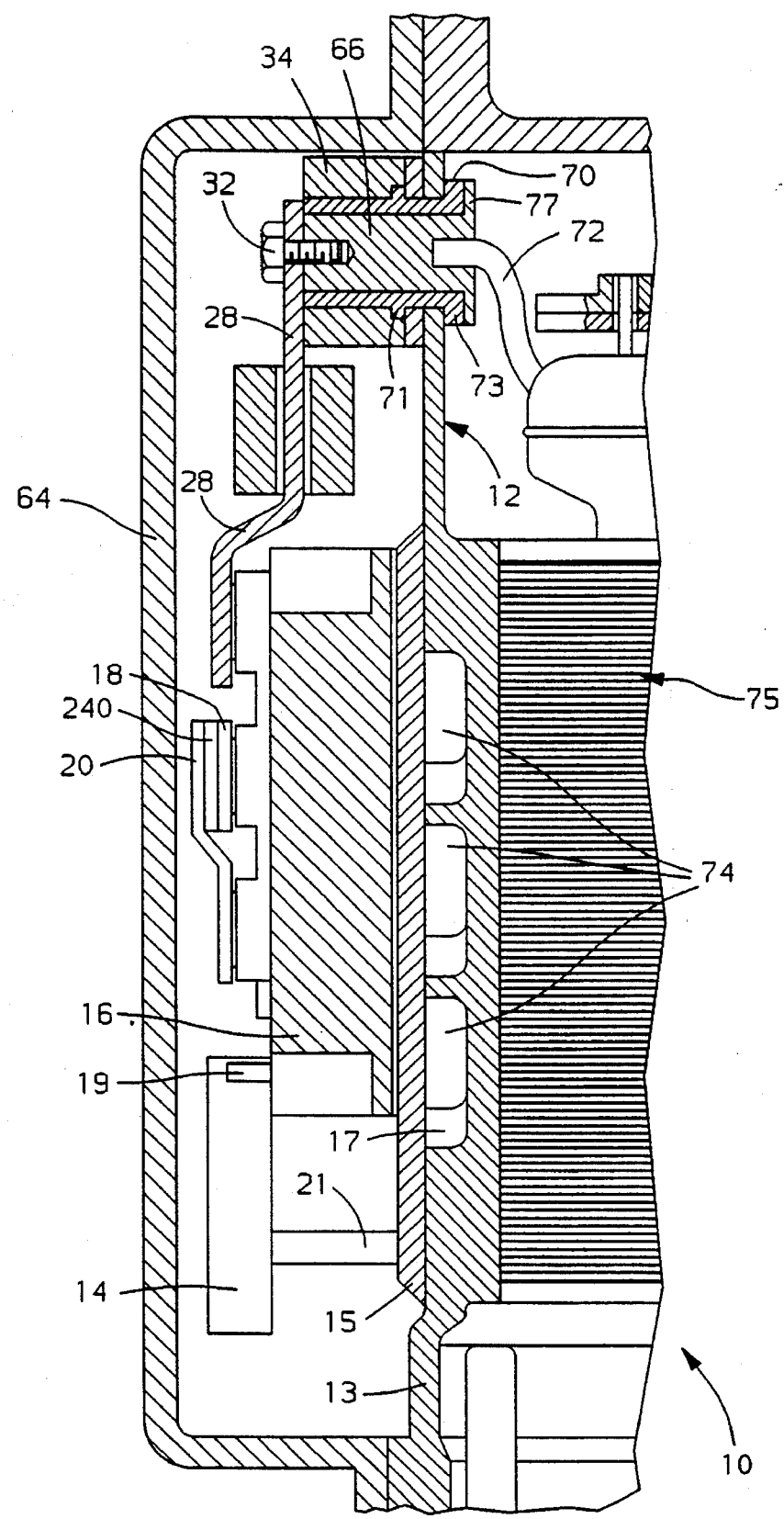
FIG. 3 is a sectional view of a modular electronic component set along the lines 3—3 in FIG. 2.

In the implementation shown, the current sensors 34 have their plastic housings molded into a round opening so that the posts 66 coupling the bus straps 28 to the stator terminals within the motor may be round and fitted with round grommets (reference 70, FIG. 3).

FIG. 1 illustrates connector 216, which is a standard high voltage, military spec connector to which the power supply line from the battery pack is connected. Bar connectors 220 couple connector 216 to two electrolytic capacitors 222 and a fuse 230 via toroid rings 218. Xcapacitor 219 is connected across the terminals of connector 216. Ycapacitor board 243 is connected across the bus terminals and to shroud 64. Xcapacitor 219, Ycapacitor board 243, and toroid rings 218 act together as a conducted EMI filter for the DC bus.

Each of the two electrolytic capacitors 222 is prone to the generation of heat and the reaching of high temperatures due to the large amount of power handled by the system. To prevent damage to capacitors 222, each capacitor is placed in contact with a heat conductive path (i.e., an aluminum block) to conduct heat away from capacitor 222 to shroud 64. With shroud 64 cast from aluminum, it can efficiently radiate heat, carrying the heat away from the capacitors 222. The heat conductive paths (i.e., bloch of heat-conductive metal) are placed in the regions 246 and 247 shown.

DC power is provided to the inverter unit from a battery pack typically at a voltage level above 250 volts. In one example, the inverter was operated at 320 volts. The DC power is stabilized by electrolytic capacitor 222 and fuse 230 is included in the circuit for over-current protection. The DC power is then coupled to bus bars 18 and 20, shown. Multi-layered capacitors 225 (i.e., 50 uF, each) stabilize the bus bars and reduce EMI noise that may occur. The spacing of the capacitors may vary from implementation to implementation, but generally, one capacitor mounted proximate to each IGBT 16 is a good rule of thumb.

Power supply 62 is a DC to DC converter, converting the high input voltage or a vehicle 12 volt power supply to a 5 volt level for use by the low voltage solid state circuitry such as gate driver 14, and to a 15 volt level for use by gate drivers 14, current sensors 34, motor position encoder 22 and sensors 44 and 52. The low voltage power is coupled to each of these units through a simple harness and connectors (not shown). The gate drivers 14 receive control commands from a logic control circuit 138 (FIG. 5) mounted separately from the unit shown.

In response to the commands from the logic control circuit, each gate driver 14 drives its respective IGBT module 16. Each IGBT module 16 comprises two high voltage, high current IGBTs connected in a half-bridge configuration with associated anti-parallel diodes. In response to the control by the gate driver 14, each IGBT 16 selectively couples the high and low voltage rails from one of the bus bars 18, 20 to the bus strap 28, wherein each bus strap 28 provides the AC voltage control for one of the stator coils. The AC power is coupled from bus strap 28 through a current sensor 34 via copper posts 66 mounted through the motor housing, as described in more detail below with reference to FIG. 3.

Connector 244 is shown for receiving commands from the logic controllers and supplying those commands via appropriate wiring to the gate drivers 14. Logic signals are provided to the gate drivers 14 by a harness (represented by dashed lines 241 shown in FIG. 2) and analog signals provided by the current sensors 34 are coupled by the harness to connector 244.

Referring now also to FIG. 3, a cut-away view of a portion of housing 12 is shown illustrating passages 74, which comprise a spiral passage through which fluid flows around the motor stator 75 to cool the motor 10. The fluid flow is also directly beneath the mounting of the IGBT modules 16 to provide direct cooling of each IGBT module 16 while, at the same time, cooling the motor 10.

Illustrated in FIG. 3 is the coupling of the AC power from bus strap 28 to stator lead connection 72. Bus strap 28 is electrically connected to and mechanically affixed to copper post 66 via bolt 32. Copper post 66 extends through Hall effect current sensor 34 and through an opening 76 in the cast housing 12. Rubber grommet 70 insulates copper post 66 isolating the post 66 from housing 12 and current sensor 34. Rubber grommet 70 includes radial protrusions 71 and 73 that seat the grommet 70 within the wall of cast housing 12. Post 66 includes a lip 77 that seats post 66 against grommet 70 on the interior of cast housing 12. Rubber grommet 70 maintains the isolation between stator lead connector 72 and cast housing 12. When the motor is assembled, one of the stator coil leads is welded to stator lead connector 72.

As illustrated in FIG. 3, the example cast housing 12 shown comprises cast body 13, including recesses 17 that comprise pan of spiral passages 74. Fitting over and welded to cast body 13 is sleeve 15, which cylindrically surrounds body 13 and closes the spaces provided by recesses 17 to form passages 74.

Each gate driver 14 is mounted to the corresponding IGBT 14 by soldering the gate driver output terminals to the small signal terminals 19 of the corresponding IGBT 16. In addition, two metal standoffs 21 are mounted between the gate drivers 14 and cast housing 12 to eliminate vibrational movement of each gate driver 14. Each metal standoff 21 may be screwed to the circuit board of the corresponding gate driver 14 and to the sleeve 15 of cast housing 12.

A portion of shroud 64 is shown. Shroud 64 comprises an aluminum cover for the electric motor and components. The aluminum cover insures that no direct contact may be made with any of the high voltage components mounted to the periphery of cast housing 12. The inner-surface of shroud 64 is coated with a ferrous material or other suitable material via a known method of applying coatings and grounded to provide EMI shielding for the integrated motor unit. The aluminum construction of shroud 64 provides excellent heat dissipation and the electrolytic capacitor referred to above may be coupled to shroud 64 for heat dissipation from the electrolytic capacitor.

The spiral nature of passages 74, which circumferentially spiral around stator 75 in the cast housing 12 can be understood with reference to FIG. 3. The passages 74 provide a spiral passage for cooling fluid, which travels in inlet 48, through the spiral passages 74 to cool the motor 10 and IGBT modules 16, and out outlet 48 to a heat transfer device of a known type where the cooling fluid may radiate the heat collected by the fluid while traveling through passages 74.

Figure 4:
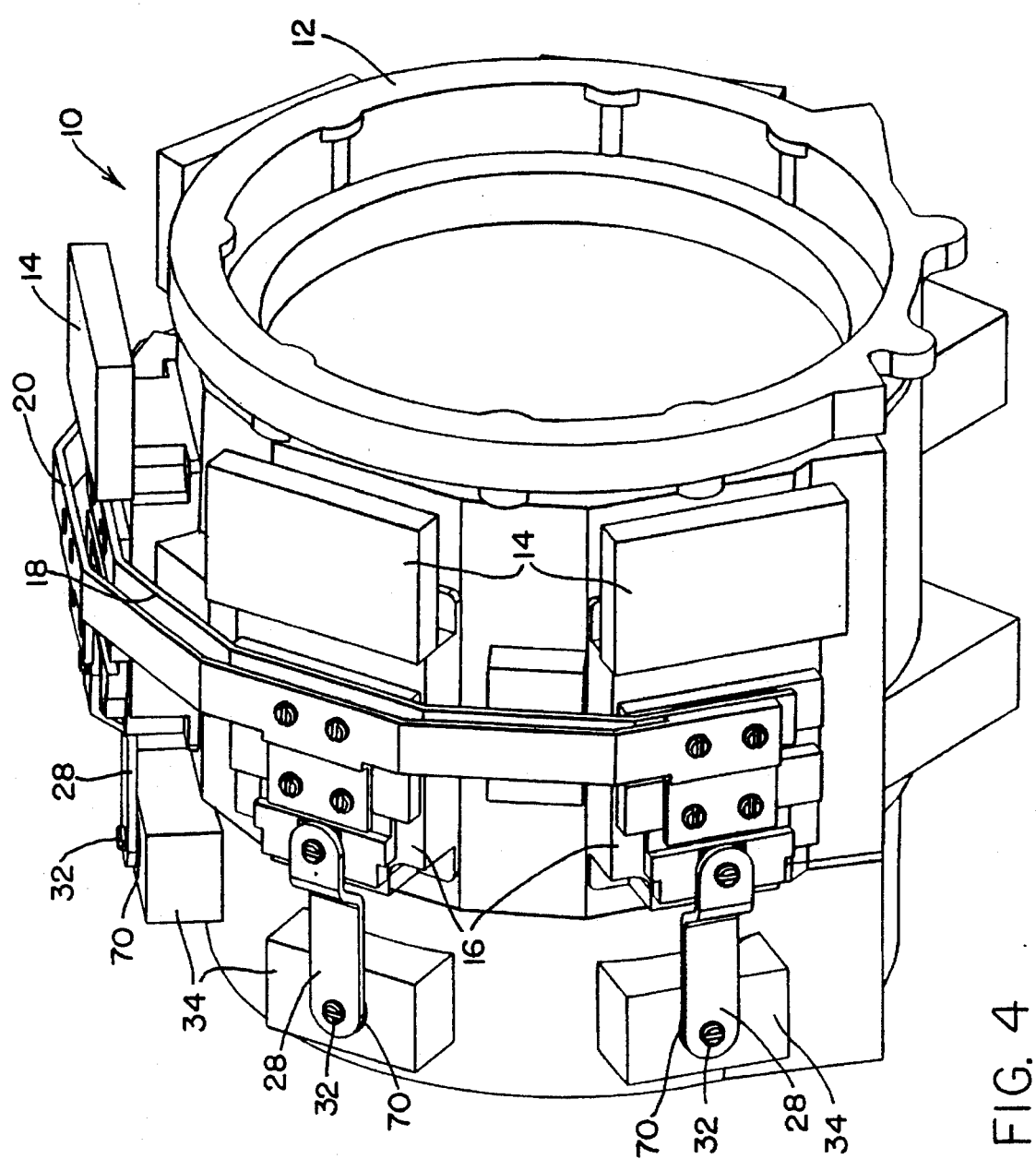
FIG. 4 is a perspective view of the motor and control electronics unit of FIGS. 1 and 2.

FIG. 4 illustrates a perspective view of the cast housing of this invention and electronic components founded thereon. The stator, which is of a known stator type mounted in the casting 12 in a known manner, is omitted.

In the above-described example, IGBT units 16 are of a type commercially available to those skilled in the art, such as Toshiba Model No. MG400J2YS41, having a capacity of 400 amperes and 600 volts. The gate drive units 14 are as described in U.S. Pat. No. 5,142,432, to Schneider, assigned to the assignee of this invention. The Hall effect sensors 34 and power supply 62 (a DC to DC converter) are of types commercially available to those skilled in the art.

Figure 5:
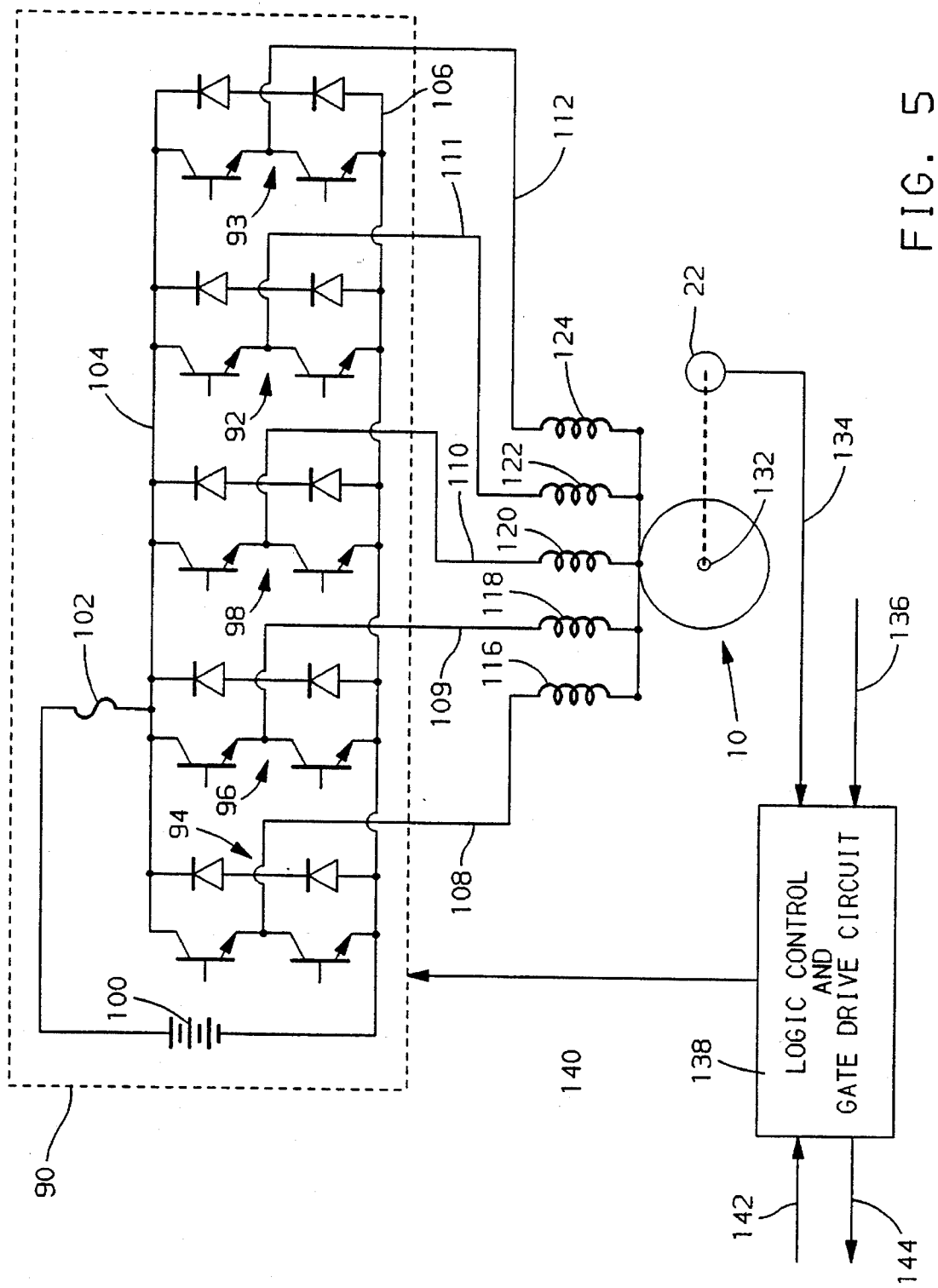
FIG. 5 is a schematic of the electronics for driving the AC motor.

Referring to FIG. 5, the schematic shown illustrates a control for a five phase induction motor useful with this invention. In general, signals are provided on bus 142 from a vehicle microprocessor to command the motor for vehicle acceleration, coasting or deceleration. The commands are received by a logic control unit 138, which also receives signals via bus 134 from the motor speed sensor 22. The temperature and sensed current signals are also provided to logic control unit 138 via lines 136. In response to the received signals, logic control unit 138 provides output signals on bus 140 to control the state of the inverters by commanding the gate drive units 14 to selectively control each IGBT 16.

The logic controller 138 performs control functions of a type known to those skilled in the an for controlling the gate drivers and the IGBT gates to controllably drive the motor 10. Typically included in the known control functions are mapping functions responsive to the rotor speed sensor 22 and the temperature and current signals on lines 136 to provide closed loop control of motor 10, controlling the motor output responsive to the commanded signals on line 142 in a manner known to those skilled in the art.

For the five-phase five-coil implementation, inverter unit 90 includes five IGBT units 92, 93, 94, 96 and 98 as shown. Each IGBT unit comprising two high voltage, high current switching devices and associated free-wheeling diodes as shown.

Power is provided from a battery pack represented as reference 100 and coupled to the high voltage rail 104 via fuse 102. The inverter unit 90 selectively couples power from one of the high voltage rails 104, 106 to the stator coils 116, 118, 120, 122 and 124 via lines 108, 110 and 112 corresponding to the AC bus straps and copper connector rods.

Figure 6A:
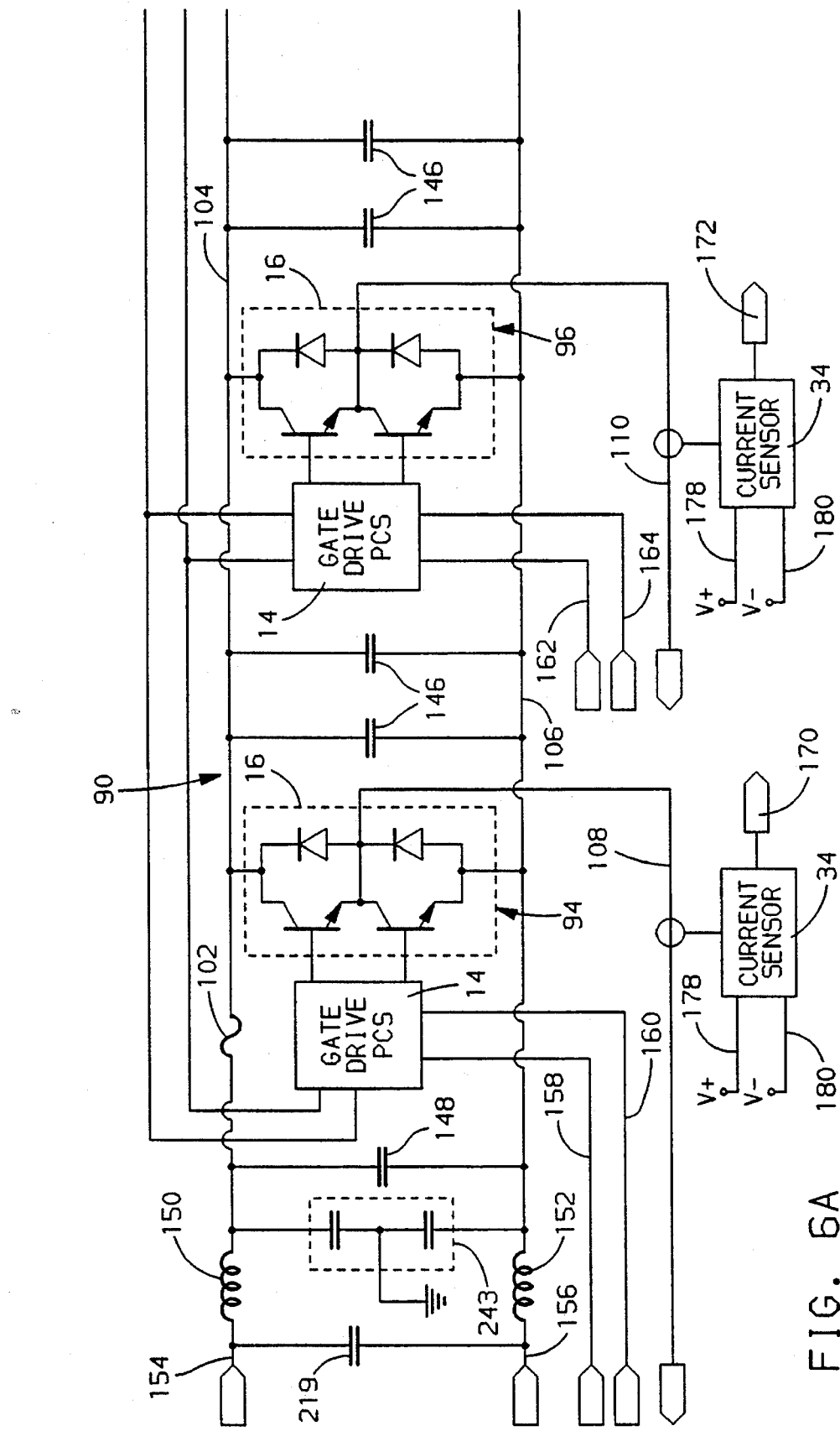
FIGS. 6a and 6b are schematics of the power stage for the AC motor drive.
Figure 6B:
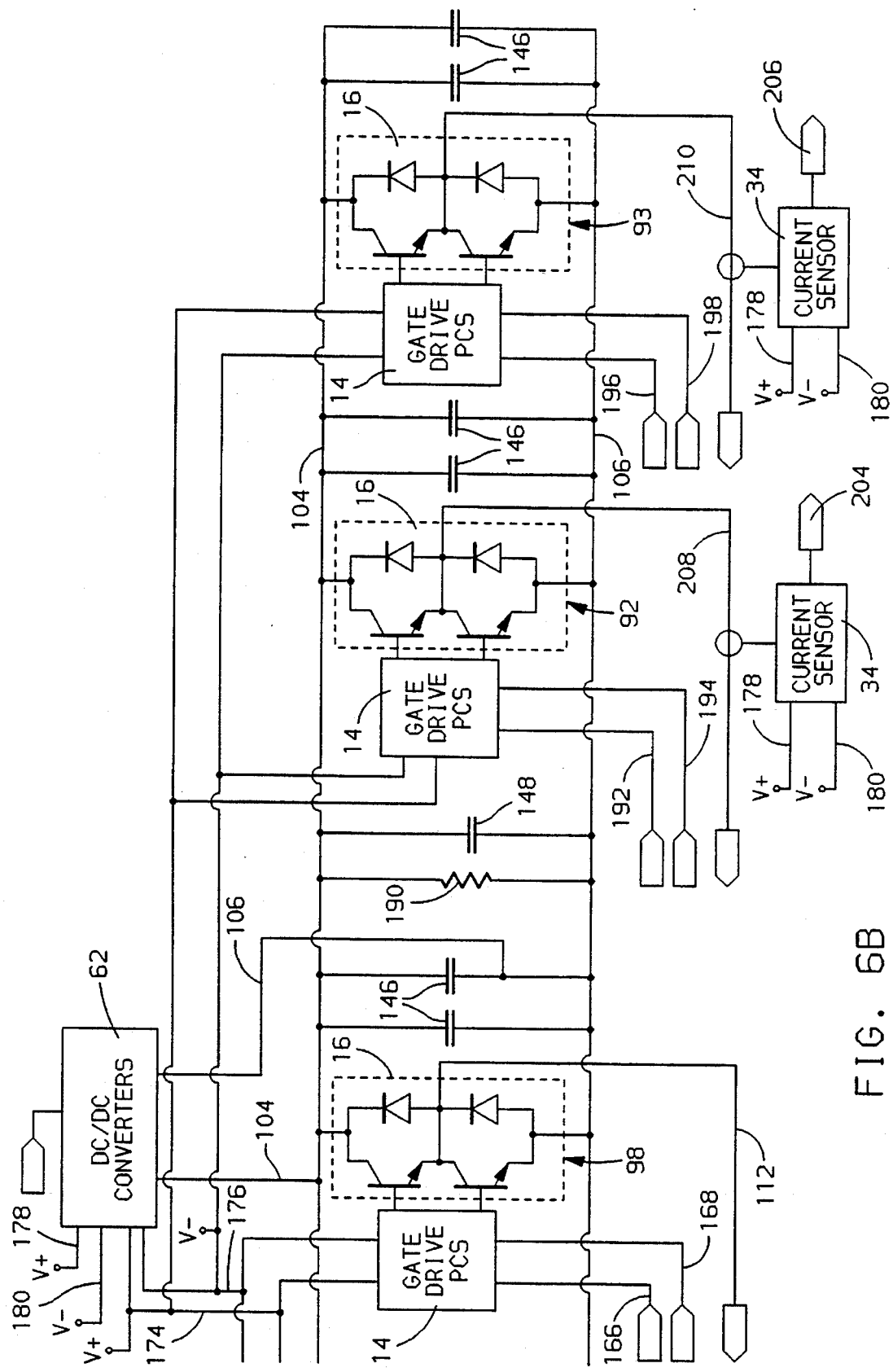

Referring now to FIGS. 6a and 6b, the battery voltage and supply lines 154 and 156, carrying the high battery voltage, are coupled to the voltage rails 104 and 106 via the line equivalent inductances 150 and 152 caused by the ferrite beads, which reduce broadcast EMI. Fuse 102 is shown coupling the high side voltage supply line 154 to line 104. DC to DC power converter unit 62 is coupled to the high voltage lines 104 and 106 or to the vehicle 12 volt power supply and converts and regulates the power to other DC voltage levels on lines 174 and 176 (5 volts) for driving the gate drivers 14 and on lines 178 and 180 (15 volts) for gate drivers 14 and for biasing the current sensors 34.

Each of the inverter bridge units comprises a gate driver 14 controlling the gates of the corresponding IGBT unit 16. Control lines 158 and 160, coupled to unit 94, command gate driver 14 to control IGBT 16 to selectively couple line 108 to either the high side rail 104 or the low side rail 106. A command on line 158 results in line 108 going high and a command on line 160 results in line 108 going low. Current through line 108 is sensed via sensor 34, which provides an output signal on line 170 indicative of the amount of current flow through lines 108. Similarly, lines 162 and 164 and lines 166, 168 control the output voltage on lines 110 and 112 for bridge units 96 and 98. Current through line 110 is sensed by the corresponding sensor 34, which responsively provides an output signal on line 172 indicative of the amount of current flow through line 110. Also similarly, lines 192 and 194 and lines 196 and 198 control the output voltage on lines 208 and 210 for bridge units 92 and 93. Current through lines 208 and 210 are sensed by current sensors 34, which provides an output signals on lines 204 and 206 to logic control and gate drive circuit 138 (FIG. 5).

At the main power input to the bridge units, electrolytic capacitor(s) 148, for example, 2400 microfarads, are used to stabilize the power supply levels against the effects of the IGBT's switching the stator coils between the high and low voltage rails. Various capacitors 146 (i.e., 1 uF) are placed across the voltage rails 104, 106 for additional EMI protection and voltage rail stabilization.

Each of the gate drivers 14 is controlled by their respective control lines 158, 160, 162, 164, 166, 168, 192, 194, 196, and 198 to selectively couple stator coil lines 108, 110, 112, 208 and 210 to the high and low voltage rails 104 and 106 and thereby controls power to the five coils of the AC motor. Through control of lines 158, 160, 164, 166, 168, 192, 194, 196 and 198, power to the five coils of the AC motor is controlled to thereby control the AC motor output in a manner well known to those skilled in the art.

The above described implementation of this invention includes a spiral cooling passage, which is a helically circumjacent passage proximate to the outer circumference of the motor stator and axially adjacent thereto. In an alternative implementation, a single (nonhelical) circumjacent passage may be implemented in which cooling fluid travels through inlet 48, a turbulent path in a singular orbital path around the motor stator through housing 12 and out fluid outlet 46 to a radiator of a known type. The single circumjacent passage preferably has an axial length coextensive with that of the motor stator.

When implementing the single circumjacent passage, it is preferable to implement the passage in a manner to create a turbulent flow of the cooling fluid. The reason for preferring a turbulent flow is as follows. If the cooling fluid is allowed to achieve a substantially laminar flow, the fluid obtains the parabolic velocity profile consistent with laminar flow. That is, the fluid in the center of the passage has the highest velocity, with the fluid closer to the passage walls having decreasing velocities. The slower moving fluid closer to the passage walls receives heat transfer directly from the motor housing 12 to provide cooling to the housing and, as a result, increases in temperature. The substantial portion of the faster moving fluid at the center of the cooling passage never comes into direct contact with the passage walls, with the result that the slower moving fluid close to the passage walls acts as an insulating layer preventing the optimal transfer of heat from the motor housing 12 to all of the fluid within the housing.

To induce turbulence in the flow of fluid through the singular circumjacent passage, several fins, towers, and/or other perturbent structures are placed in the passage. When the fluid flows through the passage and meets an obstruction in the form of one of these fins, towers and/or other perturbent structures, the fluid is forced to temporarily change direction in its attempt to seek a path through the passage around the stator and to the fluid outlet. This temporary change of direction induces turbulence in the fluid in the region of the perturbent structure and impedes the tendency that the fluid would have in the absence of a perturbent structure to form a laminar flow. The turbulent action of the fluid induced by the structures causes, as a result of the turbulence, some of the fluid close to the walls of the passage to move towards the center of the passage and displace fluid at the center of the passage, forcing that fluid to move closer to the walls of the passage. In this manner a greater portion of the fluid flowing through the passage comes into direct contact with the passage walls and the result is a more efficient use of the fluid in transferring heat away from the passage walls.

The fins, towers, and other perturbent structures also provide heat conductive paths within the housing 12 and surface area for contact and transfer of heat from the motor housing 12 to the fluid within the passage. In an example implementation, the fins, towers or other perturbent structures are cast into or welded onto the cast body 13 or, alternatively, the housing structure can be designed so that the perturbent structures are attached to the sleeve 15. Further, if the fins, towers, etc., are attached to both the cast body 13 and sleeve 15, the fins, towers, etc., can add structural integrity to the motor unit. The number, shape and location of the fins, towers and/or other perturbent structures will vary from implementation to implementation and will vary with the size, shape, and cooling requirements of the particular motor implementation.

Referring again to FIG. 3 for a further example, the wall portions of cast body 13 that helically circumscribe the cast body 13 to define the spiral passages 74 can be made to be only one or a few centimeters in length (as opposed to continuous and helically circumscribing the cast body 13 as in the spiral passage implementation). These wall portions can be irregularly placed through the passage to create the perturbent structures. This provides a singular circumjacent passage as opposed to a spiral passage having a helical nature.

The above described implementations of this invention are example implementations for motors with five coils per stator. Various other improvements and modifications to this invention, including modifications to the number of coils of the AC motor stator, the type of drive circuitry, and the shape, location and number of peripheral surfaces to which the electronic components are mounted, may occur to those skilled in the art and will fall within the scope of this invention as set forth below.

The embodiments of the invention in which an exclusive property or privilege is claimed are defined as follows:

1. An electric motive power unit including a multiple phase AC electric machine and heat dissipative electronic components therefor;

the improvement wherein the machine is disposed in a thermally conductive housing having cooling fluid passages formed therein;

the heat dissipative electronic components are individually mounted on an exterior periphery of said housing and distributed in a fashion wherein circulation of the fluid through said fluid passages for the cooling of said machine also serves to cool said heat dissipative electronic components, wherein the heat dissipative electronic components are constructed as modules, wherein each of said modules includes a gate driver circuit, an insulated gate bi-polar transistor unit; and means for coupling said insulated gate bi-polar transistor unit to said AC machine; and including a plurality of bus bars extending circumferentially around said modules to interconnect respective positive and negative high voltage terminals.

2. The apparatus of claim 1 wherein said bus bars are stacked with an insulator between the bus bars wherein each bus bar includes a surface area and wherein the surface areas of the two bus bars act as a capacitor reducing EMI of the device.

3. An electric motive power unit including a multiple phase AC electric machine and heat dissipative electronic components comprising an inverter, the improvement wherein:

the AC electric machine is mounted within a housing having, on an outer periphery thereof, a plurality of flat surfaces; and the inverter comprises a plurality of electronic modules, wherein each module is mounted on one of the plurality of flat surfaces, wherein the plurality of flat surfaces includes at least five surfaces spaced around the outer periphery of the AC electric machine and wherein the inverter comprises at least five electronic modules, each module comprising an inverter half-leg.

4. An electric motive power unit including a multiple phase AC electric machine and heat dissipative electronic components comprising an inverter, the improvement wherein;

the AC electric machine is mounted within a housing having, on an outer periphery thereof, a plurality of flat surfaces; and the inverter comprises a plurality of electronic modules, wherein each module is mounted on one of the plurality of flat surfaces, wherein the housing includes a spiral integral passage through which a cooling fluid flows to cool both the AC electric machine and the electronic modules.

5. The apparatus of claim 4, wherein the housing comprises a cast aluminum structure, with the spiral integral passage cast in the structure.

6. An electric motive power unit including a multiple phase AC electric machine and heat dissipative electronic components comprising an inverter, the improvement wherein;

the AC electric machine is mounted within a housing having, on an outer periphery thereof, a plurality of flat surfaces; and the inverter comprises a plurality of electronic modules, wherein each module is mounted on one of the plurality of flat surfaces, wherein each module comprises an inverter half-leg.

* * * * *